United States Patent
Thexton et al.

(10) Patent No.: US 7,132,808 B1
(45) Date of Patent: Nov. 7, 2006

(54) SOLID STATE SERIES MOTOR CONTROL

(76) Inventors: Graham S. Thexton, 8845 Three Notch Rd., Troy, VA (US) 22974; Andrew S. Thexton, 8845 Three Notch Rd., Troy, VA (US) 22974

( * ) Notice: Subject to any disclaimer, the term of this patent is extended or adjusted under 35 U.S.C. 154(b) by 0 days.

(21) Appl. No.: 11/237,779

(22) Filed: Sep. 29, 2005

(51) Int. Cl.
*H02P 7/06* (2006.01)

(52) U.S. Cl. ................ 318/251; 318/246; 318/250; 318/249; 318/521

(58) Field of Classification Search .......... 318/251, 318/250, 249, 521, 246, 259
See application file for complete search history.

(56) References Cited

U.S. PATENT DOCUMENTS

| | | | | |
|---|---|---|---|---|
| 2,799,818 | A |  | 7/1957 | Brown ................ 318/245 |
| 3,300,700 | A |  | 1/1967 | Wigington .......... 318/246 |
| 3,309,594 | A |  | 3/1967 | Belt et al. ........... 318/246 |
| 3,474,319 | A |  | 10/1969 | Berlin ................. 318/246 |
| 3,619,752 | A |  | 11/1971 | Bateika ............... 388/820 |
| 3,710,216 | A | * | 1/1973 | Smith .................. 318/373 |
| 3,828,235 | A |  | 8/1974 | Price et al. .......... 318/373 |
| 3,872,367 | A |  | 3/1975 | Kuriyama et al. ... 318/373 |
| 3,984,744 | A |  | 10/1976 | Moody ................ 318/442 |
| 4,002,961 | A |  | 1/1977 | Chang ................. 388/838 |
| 4,019,106 | A |  | 4/1977 | Van Doren .......... 318/252 |
| 4,259,623 | A |  | 3/1981 | Moeder et al. ...... 318/249 |
| 4,388,573 | A | * | 6/1983 | Horiuchi et al. .... 318/376 |
| 4,443,744 | A | * | 4/1984 | Konrad ............... 318/269 |
| 4,481,448 | A |  | 11/1984 | Bishop ............... 318/248 |
| 5,332,954 | A |  | 7/1994 | Lankin ............... 318/139 |
| 5,764,009 | A |  | 6/1998 | Fukaya et al. ...... 318/300 |
| 5,789,896 | A |  | 8/1998 | Fischer et al. ...... 318/759 |
| 5,875,281 | A |  | 2/1999 | Thexton et al. ..... 388/801 |
| 5,914,576 | A | * | 6/1999 | Barba ................. 318/282 |
| 5,990,640 | A |  | 11/1999 | Dwyer et al. ....... 318/254 |
| 6,710,574 | B1 |  | 3/2004 | Davis et al. ........ 318/800 |
| 2003/0090225 | A1 |  | 5/2003 | Posma et al. ....... 318/376 |

FOREIGN PATENT DOCUMENTS

| | | |
|---|---|---|
| JP | 51-149519 | 12/1976 |
| JP | 52-041314 | 3/1977 |
| JP | 63-092285 | 4/1988 |
| JP | 11-122720 | 4/1999 |

OTHER PUBLICATIONS

Internet article entitled "Brushed DC Motor", http://www.freescale.com/webapp/sps/site/overview.jsp?node d=02nQXGrrlPY7r8f7sz, 4 pages retrieved Jun. 14, 2005.

Internet article entitled "Series Wound DC Motor", http://www.airraidsirens.com/tech motors.html, 3 pages retrieved Jun. 14, 2005.

Internet article entitled "Series Wound Motor", http://www.geindustrial.com/cwc/products?pnlid=4&famid=23&catid=117&id=swdomotor&lang=en US, 1 page retrieved Jun. 14, 2005.

* cited by examiner

*Primary Examiner*—Rita Leykin
(74) *Attorney, Agent, or Firm*—Richard C. Litman

(57) ABSTRACT

A solid state series motor control includes first and second FORWARD DRIVE elements, first and second REVERSE DRIVE elements, first and second diodes, a current sensor, and a capacitance. The series motor control is configured to be interconnected with controlling logic or a processor, the field and armature of a series wound motor, and an external DC power source. The FORWARD DRIVE elements and REVERSE DRIVE elements can be IGBTs or similar semiconductors. The current sensor is configured to measure current passing through the motor armature. The capacitance is a combination of a line filter and source impedance reduction for IGBT switching. The solid state series motor control can control the speed and direction of a series wound motor using solid state components while maintaining the series connection of the armature and the field winding.

10 Claims, 1 Drawing Sheet

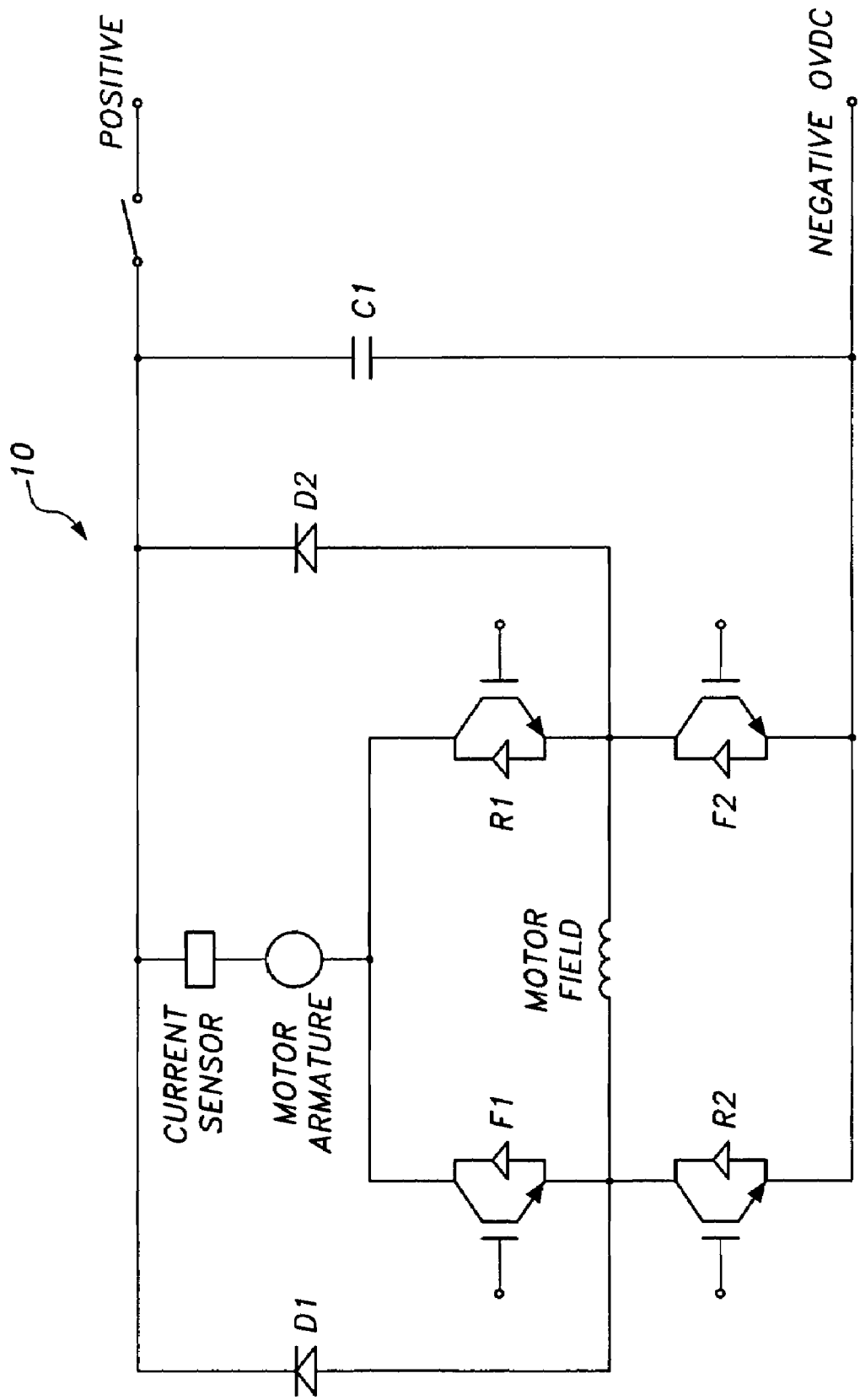

SOLID STATE SERIES MOTOR CONTROL

BACKGROUND OF THE INVENTION

1. Field of the Invention

The present invention relates generally relates to series wound motor controls and, more particularly to a solid state series motor control.

2. Description of the Related Art

Series wound motors have the armature and field winding connected in series. The operating speed of these motors is inversely proportional to the imposed load. This characteristic makes them desirable in traction drive applications, where a high starting torque is required to overcome a large inertia.

Controls for series wound motors are often the constant potential type. These controls are referred to as constant potential because the line-to-line voltage remains unchanged during motor operation. The controls apply a potential (voltage) to the motor armature at each speed point by shunting out preset segments of resistance in series with the motor. However, the motor speed is also related to field strength which is dependent on the load due to voltage drop across the series resistance). A weaker field results in faster motor speed. When high values of series resistance are used to restrict motor speed in slower speed points, a heavily loaded motion may not begin to move until the control is placed into second or third speed point. Series wound motors have a unique application on traction drives that must negotiate curves. When individual motors in same positions (opposite each other) are connected in series, they develop the same torque but allow the speeds on the inner and outer wheels to conform to the severity of the curve.

Controlling the speed and direction of series wound motor with solid state devices instead of the original contactor resistor control systems has been satisfied by reversing one section of the motor with an H-bridge topology and controlling the other section with an independent sold state switch. The motor is then controlled as a separately excited machine and uses a microprocessor with current feedback from both the armature and the field section to reconstruct the series motor characteristic. Usually the armature section is within the H-bridge and the field winding is switched independently and the system attempts to maintain the armature and field currents at the same value.

This separately excited machine configuration exposes the motor to potential damage. If the software is not functioning correctly or the current feedback is not accurate, the field current could then be much less than the armature current. With moderate differences during drive the motor can over speed and with significant differences the armature is not subject to sufficient magnetic coupling. The armature then becomes a rotating short circuit that causes significant damage to the commutator and brush gear. Since the field winding is not connected in series with the armature, rapid changes in the applied voltage to the armature can cause very high di/dt changes resulting in high voltages across the commutator segments with risk of damage to the commutator.

The true series connection always has the very inductive field winding in series with the armature and the motor itself limits the di/dt even if rapid changes in applied voltage to the motor do occur. With the motor driving, should the field current suddenly increase, then the armature voltage can rise rapidly above the supply voltage causing significantly high voltage on the commutator and exposing other devices connected to the same supply to an over voltage condition. The same conditions that caused the motor to generate result in an unexpected braking effect which can damage the equipment being driven by the motor.

The separately excited design requires at least four insulated gate bipolar transistors (IGBTs), or similar semiconductors, to form the H-bridge and one IGBT and a diode to switch the field. To deal with the potential of the regenerated voltage a second IGBT and diode are required to operate an over voltage dump system. Since the field and armature are controlled independently, the losses in the system are high causing thermal issues that need to be dealt with adding more complexity and cost. In applications where the energy source is limited, i.e. a traction battery, this inefficient system limits the operational time between battery changes. Therefore, a need exists for a solid state series motor control to control the speed and direction of a series wound motor while maintaining the series connection of the armature and the field winding.

SUMMARY OF THE INVENTION

The present invention is a solid state series motor control. The solid state series motor control includes first and second FORWARD DRIVE elements, first and second REVERSE DRIVE elements, first and second diodes, a current sensor, and a capacitance. The series motor control is configured to be interconnected with controlling logic or a processor, the field and armature of a series wound motor, and an external DC power source. The FORWARD DRIVE elements and REVERSE DRIVE elements can be IGBTs or similar semiconductors. The current sensor is configured to measure current passing through the motor armature. The capacitance is a combination of a line filter and source impedance reduction for IGBT switching. The solid state series motor control can control the speed and direction of a series wound motor using solid state components while maintaining the series connection of the armature and the field winding.

When the FORWARD DRIVE elements and REVERSE DRIVE elements are IGBTs each has an emitter, gate and a collector. The collector of the first FORWARD DRIVE IGBT is interconnected to the motor armature, the emitter of the first FORWARD DRIVE IGBT and the collector of the second REVERSE DRIVE IGBT is interconnected to the first diode, the emitter of the first REVERSE DRIVE IGBT and the collector of the second FORWARD DRIVE IGBT is interconnected to the second diode, the current sensor is interconnected to the motor armature and the first and second diodes, and the capacitance is interconnected to the first and second diodes, the current sensor, and the emitters of the second FORWARD and REVERSE DRIVE IGBTs.

A solid state series motor control method provides a solid state series motor control with first and second FORWARD DRIVE elements, first and second REVERSE DRIVE elements, first and second diodes, a current sensor, and a capacitance; and interconnects the solid state series motor control with controlling logic or a processor, the field and armature of a series wound motor, and an external DC power source.

The solid state series motor control method can configure the FORWARD DRIVE elements and REVERSE DRIVE elements as IGBTs each having an emitter, gate and a collector. The solid state series motor control method can interconnect the collector of the first FORWARD DRIVE IGBT to the motor armature, interconnect the emitter of the first FORWARD DRIVE IGBT and the collector of the second REVERSE DRIVE IGBT to the first diode, interconnect the emitter of the first REVERSE DRIVE IGBT and the collector of the second FORWARD DRIVE IGBT to the second diode, interconnect the current sensor to the motor armature and the first and second diodes, and interconnect the capacitance to the first and second diodes, the current sensor, and the emitters of the second FORWARD and REVERSE DRIVE IGBTs.

The solid state series motor control method can drive the motor forward by gating the first and second REVERSE DRIVE IGBTs OFF, gating the first FORWARD DRIVE IGBT ON, and modulating the second FORWARD DRIVE IGBT to vary the voltage and current in the motor. The solid state series motor control method can drive the motor in reverse by gating the first and second FORWARD DRIVE IGBTs OFF, gating the first REFVERSE DRIVE IGBT ON, and modulating the second REVERSE DRIVE IGBT to vary the voltage and current in the motor.

The solid state series motor control method can brake the motor from forward drive by gating the first and second FORWARD DRIVE IGBTs OFF, gating the first REVERSE DRIVE IGBT ON, and modulating the second REVERSE DRIVE IGBT to reverse the field with respect to the armature and to control the field strength. The solid state series motor control method can generate armature current by the first REVERSE DRIVE IGBT and the second diode, measure the current with the current sensor, and determine a value of the generated current by armature revolutions per minute and a value of current in the field.

The solid state series motor control method can brake the motor from reverse drive by gating the first and second REVERSE DRIVE IGBTs OFF, gating the first FORWARD DRIVE IGBT ON, and modulating the second FORWARD DRIVE IGBT to reverse the field with respect to the armature and to control the field strength. The solid state series motor control method can generate armature current by the first FORWARD DRIVE IGBT and the first diode, measure the current with the current sensor, and determine a value of the generated current by armature revolutions per minute and a value of current in the field.

BRIEF DESCRIPTION OF THE DRAWINGS

The sole FIGURE is a schematic diagram of a solid state series motor control according to the present invention.

DETAILED DESCRIPTION OF THE PREFERRED EMBODIMENTS

The present invention is a solid state series motor control. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Referring to the drawing, a solid state series motor control 10 is shown interconnected to the field and armature of a series wound motor, and to an external DC power source. The solid state series motor control controls the speed and direction of the series wound motor using solid state components while maintaining the series connection of the armature and the field winding. This eliminates the previously described causes of motor failure, simplifies the control software, reduces thermal losses, thus increasing the system efficiency and reducing cooling costs, reduces the semiconductor and associated driver counts to reduce the system cost, and increase the mean time between failure by reducing the component count of the IGBTs, IGBT drivers and current transducers.

The motor control 10 has an H-bridge with two FORWARD DRIVE and two REVERSE DRIVE IGBTs or similar semiconductors F1, F2, R1 and R2, two diodes D1 and D2, a current sensor and a capacitance C1. The motor control 10 is configured to be interconnected with controlling logic or a processor. The current sensor measures current passing through the motor armature. The capacitance C1 is a combination of a line filter and source impedance reduction for the IGBT switching.

To drive the motor forward the REVERSE DRIVE IGBTs R1 and R2 are gated OFF. One FORWARD DRIVE IGBT F1 is gated ON, and the other FORWARD DRIVE IGBT F2 is modulated to vary the voltage and current in the motor. One diode D2 carries the motor current during the OFF time of the modulated DRIVE FORWARD IGBT F2. The current sensor measures the current and provides the measured current to the controlling logic or processor. The controlling logic or processor can then control the current and voltage by modulating the modulated DRIVE FORWARD IGBT F2.

To drive the motor in reverse, the FORWARD DRIVE IGBTs F1 and F2 are gated OFF. One REVERSE DRIVE IGBT R1 is gated ON and the other REVERSE DRIVE IGBT R2 is modulated to vary the voltage and current of the motor. One diode D1 carries the motor current during the off time of the modulated REVERSE DRIVE IGBT R2. The current sensor measures the current and provides the measured current to the controlling logic or processor. The controlling logic or processor can then control the current and voltage by modulating the modulated REVERSE DRIVE IGBT R2.

To brake the motor from forward drive, the FORWARD DRIVE IGBTs F1 and F2 are gated OFF. One REVERSE DRIVE IGBT R1 is gated ON and the other REVERSE DRIVE IGBT R2 is modulated to reverse the field with respect to the armature and to control the field strength. The armature now generates by one REVERSE DRIVE IGBT R1 and one diode D2. The current sensor measures the current. The value of the generated current is determined by the armature revolutions per minute and the value of the field current. The controlling logic or processor controls by modulating the modulated REVERSE DRIVE IGBT R2.

To brake the motor from REVERSE DRIVE, the REVERSE DRIVE IGBTs R1 and R2 are gated OFF. One FORWARD DRIVE IGBT F1 is gated ON and the other FORWARD DRIVE IGBT F2 is modulated to reverse the field with respect to the armature and to control the field strength. The armature now generates by one FORWARD DRIVE IGBT F1 and one diode D1. The current sensor measures the current. The value of the generated current is determined by the armature revolutions per minute and the value of the field current. The controlling logic or processor controls by modulating the modulated FORWARD DRIVE IGBT F2.

In summary, a solid state series motor control according to the invention includes first and second FORWARD DRIVE elements, first and second REVERSE DRIVE elements, first and second diodes, a current sensor, and a capacitance. The series motor control is configured to be interconnected with controlling logic or a processor, the field and armature of a series wound motor, and an external DC power source. The FORWARD DRIVE elements and REVERSE DRIVE elements can be IGBTs or similar semiconductors. The current sensor is configured to measure current passing through the motor armature. The capacitance is a combination of a line filter and source impedance reduction for IGBT switching. The solid state series motor control can control the speed and direction of a series wound motor using solid state components while maintaining the series connection of the armature and the field winding.

When the FORWARD DRIVE elements and REVERSE DRIVE elements are IGBTs each has an emitter, gate and a collector. The collector of the first FORWARD DRIVE IGBT is interconnected to the motor armature, the emitter of the first FORWARD DRIVE IGBT and the collector of the second REVERSE DRIVE IGBT is interconnected to the first diode, the emitter of the first REVERSE DRIVE IGBT and the collector of the second FORWARD DRIVE IGBT is interconnected to the second diode, the current sensor is interconnected to the motor armature and the first and second diodes, and the capacitance is interconnected to the first and second diodes, the current sensor, and the emitters of the second FORWARD and REVERSE DRIVE IGBTs.

A solid state series motor control method provides a solid state series motor control with first and second FORWARD DRIVE elements, first and second REVERSE DRIVE elements, first and second diodes, a current sensor, and a capacitance; and interconnects the solid state series motor control with controlling logic or a processor, the field and armature of a series wound motor, and an external DC power source.

The solid state series motor control method can configure the FORWARD DRIVE elements and REVERSE DRIVE elements as IGBTs each having an emitter, gate and a collector. The solid state series motor control method can interconnect the collector of the first FORWARD DRIVE IGBT to the motor armature, interconnect the emitter of the first FORWARD DRIVE IGBT and the collector of the second REVERSE DRIVE IGBT to the first diode, interconnect the emitter of the first REVERSE DRIVE IGBT and the collector of the second FORWARD DRIVE IGBT to the second diode, interconnect the current sensor to the motor armature and the first and second diodes, and interconnect the capacitance to the first and second diodes, the current sensor, and the emitters of the second FORWARD and REVERSE DRIVE IGBTs.

The solid state series motor control method can drive the motor forward by gating the first and second REVERSE DRIVE IGBTs OFF, gating the first FORWARD DRIVE IGBT ON, and modulating the second FORWARD DRIVE IGBT to vary the voltage and current in the motor. The solid state series motor control method can drive the motor in reverse by gating the first and second FORWARD DRIVE IGBTs OFF, gating the first REFVERSE DRIVE IGBT ON, and modulating the second REVERSE DRIVE IGBT to vary the voltage and current in the motor.

The solid state series motor control method can brake the motor from forward drive by gating the first and second FORWARD DRIVE IGBTs OFF, gating the first REVERSE DRIVE IGBT ON, and modulating the second REVERSE DRIVE IGBT to reverse the field with respect to the armature and to control the field strength. The solid state series motor control method can generate armature current by the first REVERSE DRIVE IGBT and the second diode, measure the current with the current sensor, and determine a value of the generated current by armature revolutions per minute and a value of current in the field.

The solid state series motor control method can brake the motor from reverse drive by gating the first and second REVERSE DRIVE IGBTs OFF, gating the first FORWARD DRIVE IGBT ON, and modulating the second FORWARD DRIVE IGBT to reverse the field with respect to the armature and to control the field strength. The solid state series motor control method can generate armature current by the first FORWARD DRIVE IGBT and the first diode, measure the current with the current sensor, and determine a value of the generated current by armature revolutions per minute and a value of current in the field.

While the invention has been described with references to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A solid state series motor control comprising:
   first and second FORWARD DRIVE elements;
   first and second REVERSE DRIVE elements;
   wherein said FORWARD DRIVE elements and REVERSE DRIVE elements are insulated gate bipolar transistors (IGBTS) each having an emitter, gate and a collector;
   first and second diodes;
   a current sensor; and
   a capacitance;
   wherein the collector of the first FORWARD DRIVE IGBT is interconnected to a motor armature, the emitter of the first FORWARD DRIVE IGBT and the collector of the second REVERSE DRIVE IGBT is interconnected to the first diode, the emitter of the first REVERSE DRIVE IGBT and the collector of the second FORWARD DRIVE IGBT is interconnected to the second diode, the current sensor is interconnected to the motor armature and the first and second diodes, and the capacitance is interconnected to the first and second diodes, the current sensor, and the emitters of the second FORWARD and REVERSE DRIVE IGBTs
   wherein said series motor control is configured to be interconnected with controlling logic or a processor, the field and armature of a series wound motor, and an external DC power source.

2. The solid state series motor control according to claim 1, wherein said current sensor is configured to measure current passing through the motor armature.

3. The solid state series motor control according to claim 1, in combination with a series wound motor having an armature and a field.

4. A solid state series motor control method comprising:
   providing a solid state series motor control with first and second FORWARD DRIVE elements, first and second REVERSE DRIVE elements, first and second diodes, a current sensor, and a capacitance;
   configuring the FORWARD DRIVE elements and REVERSE DRIVE elements as insulated gate bipolar transistors (IGBTs) each having an emitter, gate and a collector;
   interconnecting the collector of the first FORWARD DRIVE IGBT to the motor armature;
   interconnecting the emitter of the first FORWARD DRIVE IGBT and the collector of the second REVERSE DRIVE IGBT to the first diode;
   interconnecting the emitter of the first REVERSE DRIVE IGBT and the collector of the second FORWARD DRIVE IGBT to the second diode;
   interconnecting the current sensor to the motor armature and the first and second diodes; and
   interconnecting the capacitance to the first and second diodes, the current sensor and the emitters of the second FORWARD and REVERSE DRIVE IGBTs; and
   interconnecting the solid state series motor control with controlling logic or a processor, the field and armature of a series wound motor, and an external DC power source.

5. The solid state series motor control method according to claim 4, further comprising:
   driving the motor forward by gating the first and second REVERSE DRIVE IGBTs OFF;
   gating the first FORWARD DRIVE IGBT ON; and modulating the second FORWARD DRIVE IGBT to vary the voltage and current in the motor.

6. The solid state series motor control method according to claim 4, further comprising:

driving the motor in reverse by gating the first and second FORWARD DRIVE IGBTs OFF;

gating the first REFVERSE DRIVE IGBT ON; and modulating the second REVERSE DRIVE IGBT to vary the voltage and current in the motor.

7. The solid state series motor control method according to claim 4, further comprising:

braking the motor from forward drive by gating the first and second FORWARD DRIVE IGBTs OFF;

gating the first REVERSE DRIVE IGBT ON; and modulating the second REVERSE DRIVE IGBT to reverse the field with respect to the armature and to control the field strength.

8. The solid state series motor control method according to claim 7, further comprising:

generating armature current by the first REVERSE DRIVE IGBT and the second diode;

measuring the current with the current sensor; and determining a value of the generated current by armature revolutions per minute and a value of current in the field.

9. The solid state series motor control method according to claim 4, further comprising:

braking the motor from reverse drive by gating the first and second REVERSE DRIVE IGBTs OFF;

gating the first FORWARD DRIVE IGBT ON; and modulating the second FORWARD DRIVE IGBT to reverse the field with respect to the armature and to control the field strength.

10. The solid state series motor control method according to claim 9, further comprising:

generating armature current by the first FORWARD DRIVE IGBT and the first diode;

measuring the current with the current sensor; and determining a value of the generated current by armature revolutions per minute and a value of current in the field.

* * * * *

UNITED STATES PATENT AND TRADEMARK OFFICE
CERTIFICATE OF CORRECTION

| | | |
|---|---|---|
| PATENT NO. | : 7,132,808 B1 | Page 1 of 1 |
| APPLICATION NO. | : 11/237779 | |
| DATED | : November 7, 2006 | |
| INVENTOR(S) | : Graham S. Thexton | |

It is certified that error appears in the above-identified patent and that said Letters Patent is hereby corrected as shown below:

On the Title Page,
    Item (76) is corrected as follows:
    -- (76) Inventor: Graham S. Thexton, 8845 Three Notch Rd., Troy, VA (US) 22974 --

Signed and Sealed this
Tenth Day of December, 2013

Margaret A. Focarino
*Commissioner for Patents of the United States Patent and Trademark Office*